US010995250B2

(12) United States Patent
Van Dessel et al.

(10) Patent No.: US 10,995,250 B2
(45) Date of Patent: May 4, 2021

(54) THERMAL STORAGE SYSTEM

(71) Applicant: Worcester Polytechnic Institute, Worcester, MA (US)

(72) Inventors: Steven Van Dessel, Worcester, MA (US); Mingjiang Tao, Worcester, MA (US); Sergio Granados-Focil, Worcester, MA (US)

(73) Assignee: Worcester Polytechnic Institute, Worcester, MA (US)

(*) Notice: Subject to any disclaimer, the term of this patent is extended or adjusted under 35 U.S.C. 154(b) by 8 days.

(21) Appl. No.: 16/197,698

(22) Filed: Nov. 21, 2018

(65) Prior Publication Data
US 2019/0194515 A1 Jun. 27, 2019

Related U.S. Application Data

(60) Provisional application No. 62/589,118, filed on Nov. 21, 2017.

(51) Int. Cl.
*C09K 5/04* (2006.01)
*B01J 20/16* (2006.01)
(Continued)

(52) U.S. Cl.
CPC .............. *C09K 5/047* (2013.01); *B01J 20/165* (2013.01); *C08F 220/18* (2013.01);
(Continued)

(58) Field of Classification Search
CPC . C09K 3/185; C09K 5/02; C09K 5/14; C09K 5/047
See application file for complete search history.

(56) References Cited

U.S. PATENT DOCUMENTS 6,379,582 B1   4/2002  Putman
2002/0083968 A1   7/2002  Pierce et al.
(Continued)

FOREIGN PATENT DOCUMENTS

JP    2009-161771    *  4/2009
JP    4487029 B2       6/2010
(Continued)

OTHER PUBLICATIONS

International Search Report, PCT/US2018/062216, dated Mar. 28, 2019, pp. 2.

*Primary Examiner* — John R Hardee
(74) *Attorney, Agent, or Firm* — Armis IP Law, LLC

(57) ABSTRACT

A thermal storage composition is defined by a polymer having thermally responsive absorption or passage capabilities based on an Upper Critical Solution Temperature (UCST) or Lower Critical Solution Temperature (LCST), and a sorbent in fluidic communication with the polymer. A fluid such as water conveys thermal energy between the polymer and the sorbent based on an identified target temperature that acts as a thermostat for synergistic fluid release and transfer between the polymer and sorbent that stores and releases heat energy in a cyclic manner. The composition includes a synergistic integration of a sorbent and selectively hydrophilic polymer to alternately hydrate according to a target temperature based on the UCST of the water/sorbent combination.

10 Claims, 8 Drawing Sheets

(51) Int. Cl.
  *C08F 220/56* (2006.01)
  *C08F 220/18* (2006.01)
  *C08F 220/44* (2006.01)
  *C08L 33/26* (2006.01)
  *C08L 33/20* (2006.01)
(52) U.S. Cl.
  CPC .......... *C08F 220/44* (2013.01); *C08F 220/56* (2013.01); *C08L 33/20* (2013.01); *C08L 33/26* (2013.01)

(56) References Cited

U.S. PATENT DOCUMENTS

| | | | |
|---|---|---|---|
| 2010/0058782 A1* | 3/2010 | Brovchenko | F28F 23/00 62/112 |
| 2013/0034732 A1 | 7/2013 | Parker et al. | |
| 2013/0192281 A1 | 8/2013 | Nam et al. | |
| 2018/0017604 A1 | 6/2018 | Kim et al. | |

FOREIGN PATENT DOCUMENTS

| | | |
|---|---|---|
| WO | WO 1995/029965 A1 | 11/1995 |
| WO | WO 2001012748 A1 | 2/2001 |
| WO | WO 2014071528 A1 | 5/2014 |

\* cited by examiner

Thermo-responsive polymer
Hydrophilic state ($T_{SP}$>UCST)

Hydrophobic state ($T_{SP}$<UCST)

THERMAL STORAGE SYSTEM

RELATED APPLICATIONS

This patent application claims the benefit under 35 U.S.C. § 119(e) of U.S. Provisional Patent Application No. 62/589,118, filed Nov. 21, 2018, entitled "THERMAL STORAGE SYSTEM," incorporated herein by reference in entirety.

BACKGROUND

Conventional thermal energy storage systems include sensible heat storage (liquids such as water or solid materials such as concrete), latent heat storage (phase change materials) and thermochemical heat storage systems (sorption and chemical reaction systems). In a sorption process, heat is stored by breaking the binding forces between a sorbent and a sorbate, and released at a later time by re-absorption of the sorbate. Sorption systems have the advantage of being able to store heat indefinitely, and to release this heat in a well-controlled manner with addition of a sorbate such as water.

The ever increasing world energy consumption has created a need to find new ways to use energy resources in a more efficient and rational way. Thermal energy storage systems provide the potential to attain energy savings, which in turn reduce the environmental impact related to energy use. Recently, there has been an increased interest in sorption thermal energy storage systems due to their high storage density and the ability to store heat indefinitely at ambient temperatures without self-discharge.

SUMMARY

A thermal storage composition is defined by a polymer having thermally responsive absorption capabilities based on an upper critical solution temperature (UCST), and a sorbent in fluidic communication with the polymer. A fluid such as water conveys thermal energy between the polymer and the sorbent based on an identified target temperature that acts as a thermostat for synergistic fluid release and transfer between the polymer and sorbent that stores and releases heat energy in a cyclic manner.

Configurations herein are based, in part, on the observation that energy conservation and efficiency are becoming higher profile social issues as concern over finite fossil fuels grows. Modern industry has embraced "green" practices, self-sustaining "zero footprint" buildings and hybrid cars, to identify several widely publicized aspects of energy management. Unfortunately, conventional approaches to energy management suffer from the shortcoming of higher complexity or cost, such as mechanical systems and passive photoelectric panels, or impracticability on a scale needed to effect a substantial thermal load. Accordingly, configurations herein substantially overcome these shortcomings by providing a sorbent-thermo-responsive polymer composite for smart, self-contained, long-term thermal storage with material-enabled control mechanisms that enable the gradual and demand-driven release of stored heat. The disclosed sorbent materials system employs a synergistic integration of a sorbent and selectively hydrophilic polymer to alternately hydrate according to a target temperature based on an Upper Critical Solution Temperature (UCST) of the thermo-responsive polymer.

The disclosed smart thermal storage system includes a sorbent and a thermo-responsive polymer engineered in such a way that the sorbent stores thermal energy (from solar or waste heat resources) based on adsorption-desorption principles. The stored heat is then released when the system encounters a thermal stimulus from its environment in a time-controlled, and self-contained way. Therefore, the thermo-responsive polymer acts as a temperature-dependent water reservoir and gating mechanism for supplying water to the sorbent, by changing its hydrophobicity once the ambient temperature falls below its Upper Critical Solution Temperature (UCST).

The synergistic sorbent and polymer result from a method for forming a thermal energy storage composition including identifying a target temperature for heat release, such that the target temperature defines a temperature below which stored thermal energy is to be released. A sorbent, such as a zeolite based material is identified. The method includes synthesizing a polymer having a UCST with a fluidic medium at or near the identified target temperature, and disposing the sorbent in fluidic communication with the polymer, such that the sorbent is adapted to absorb the fluidic medium and release the fluidic medium to the polymer at ambient temperatures above the UCST,

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example composition, system and method for forming and deploying the thermal storage composition as disclosed herein. The thermal storage composition may be incorporated in various contexts where thermal inertia contributes to cyclic thermal influences, such as in structures and residences where ambient temperatures vary between night and day. Other applications may be industrial applications where periodic machine operation has a heating effect followed by a cooling period when machinery is idle. The thermal storage composition may define a surface, veneer, or mass present in or surrounding the perimeter of an area benefiting from the disclosed thermal charging and discharge cycles. Alternate approaches may be apparent to those of skill in the art.

While sorption-based technologies have high energy density at material level, most of the current sorption-based technologies entail the use of other mechanical and electrical parts for their applications, which adds complexity to the system configuration and results in low heat storage density at the system level. Configurations herein disclose a self-contained responsive sorption-desorption system with material-enabled passive control mechanisms that enhance overall system efficiency. The proposed sorbent-thermo-responsive polymer system helps not only release heat in a time-controlled manner but also allows scaling down of such systems to a micro level. The proposed system is also robust in terms of being relatively independent on the availability pattern of heat, whether it is continuous, cyclic or intermittent. The disclosed system also alleviates two important problems commonly encountered in conventional (sensible and latent) heat storage systems. First, the system is able to indefinitely hold on to its stored heat whereas traditional sensible and latent heat storage approaches lose thermal energy over time due to conductive, convective, or radiative heat exchange. Second, the system can be tailored to release heat at a well-defined temperature by controlling the UCST of the thermo-responsive polymer, which allows the system to be tailored for different thermal applications. The upper critical solution temperature (UCST) or upper consolute temperature is a temperature above which the components of a mixture are miscible in all proportions. Generally, the upper qualification indicates that the UCST is an upper bound to a temperature range of partial miscibility, or miscibility for certain compositions only.

Figure 1:
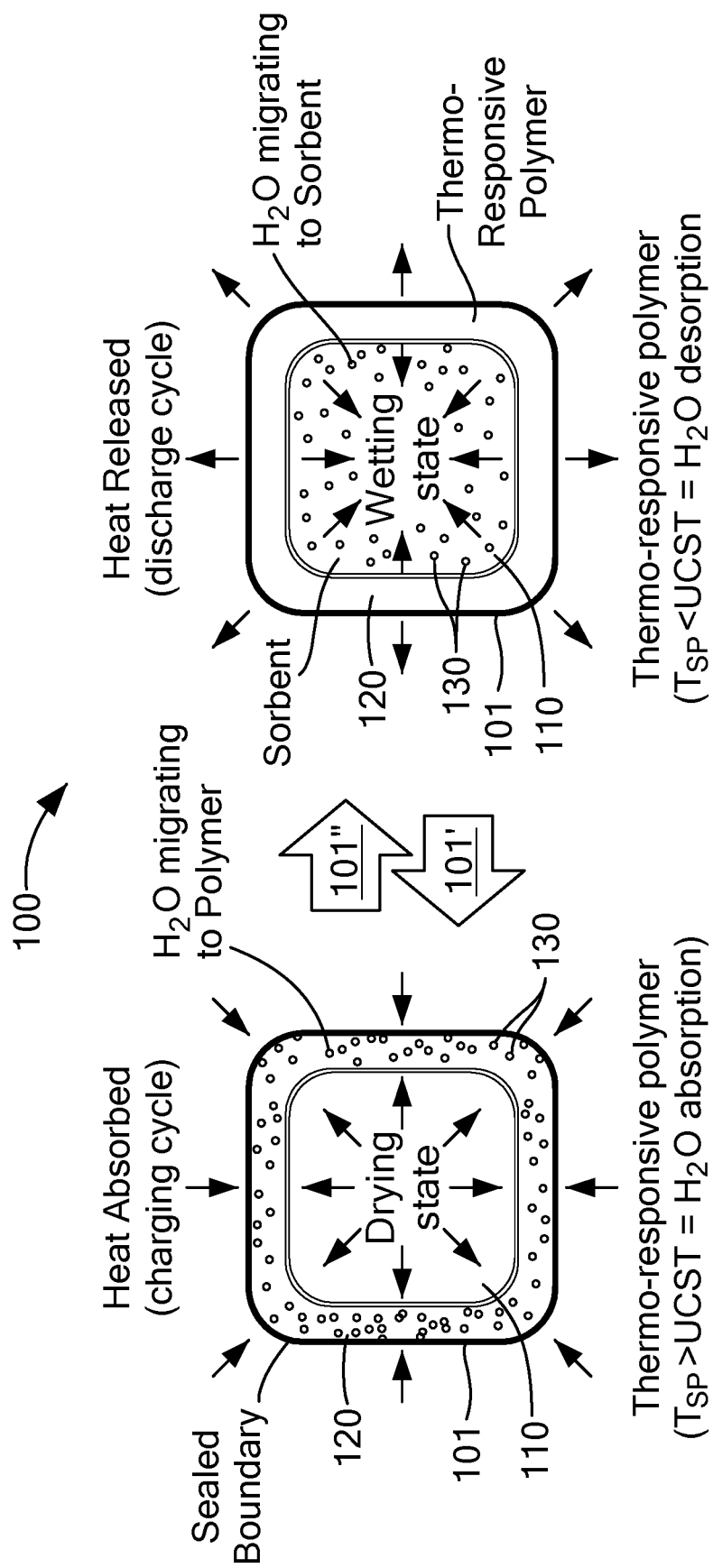
FIG. 1 is a context diagram of the thermo-responsive polymer and sorbent in a thermal charge and release cycle as disclosed herein.

FIG. 1 is a context diagram of the thermo-responsive polymer and sorbent in a thermal charge and release cycle 100 as disclosed herein. In the configurations below, a thermal storage composition 101 includes a polymer 120 having thermally responsive absorption capabilities based on an upper critical solution temperature (UCST), and a sorbent 110 in fluidic communication with the polymer 120. A fluid such as water 130 or other suitable sorbate conveys thermal energy between the polymer 120 and the sorbent 110.

Continuing to refer to FIG. 1, heat absorption and release in the sorbent 110 (the "thermal battery") is triggered and controlled by the thermo-responsive polymer 120 (the "water reservoir") as it responds to an external thermal stimulus. In the charging cycle shown by arrow 101', the temperature of both the thermo-responsive polymer 120 and the sorbent 110 increases as the system heats up; as the polymer's temperature exceeds its UCST it changes from hydrophobic to hydrophilic absorbing water or other suitable sorbate from the sorbent, while the sorbent 110 rises above its regeneration temperature, releasing the water 130 (or other thermally responsive fluid sorbate). In the discharging cycle 101", the polymer 110 becomes hydrophobic and expels water as the ambient temperature drops below its UCST.

Figure 1A:
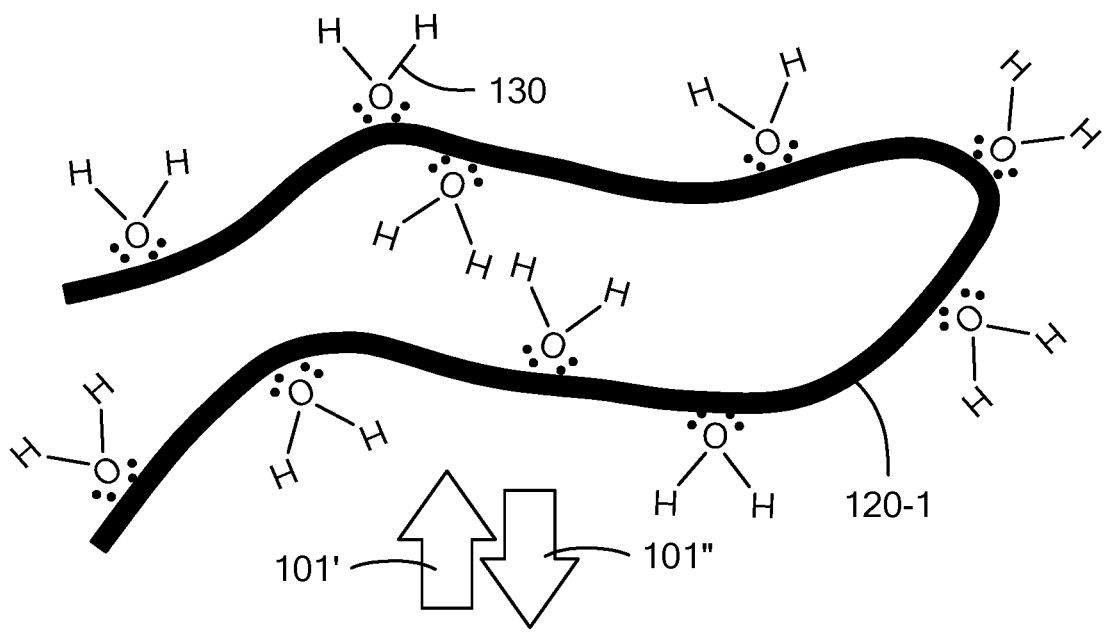
FIG. 1A shows a hydrophilic-hydrophobic change in the polymer of FIG. 1.
Figure 1A:
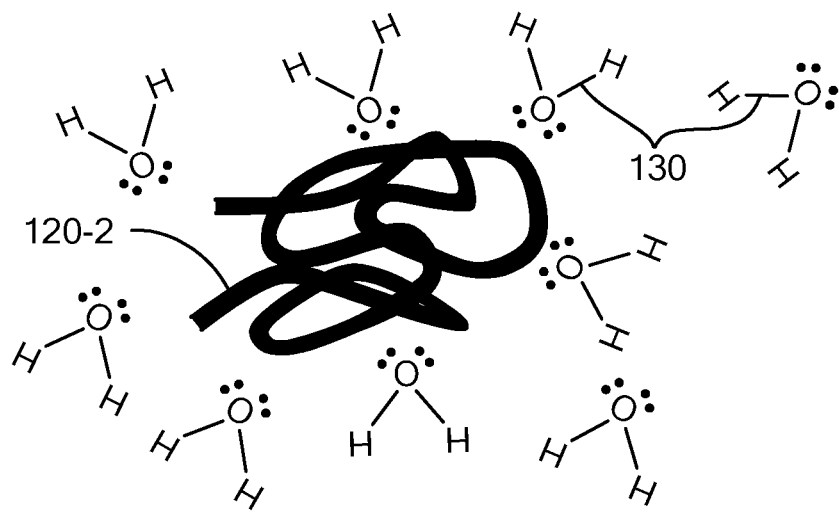

FIG. 1A shows a hydrophilic-hydrophobic change in the polymer of FIG. 1. Referring to FIG. 1A, the polymer 120 is typically defined by a chain that selectively bonds with water molecules 130, such that the polymer 120 (generally) changes from hydrophobic 120-2 to hydrophilic 120-1 for absorbing water 130 at a temperature above the UCST. The polymer 120, synthesized as discussed below, has selective hydrophobicity based on the UCST such that during transition to the charging cycle 101' the polymer 120 bonds with or absorbs water molecules 130, and releases them to the sorbent 110 during a thermal discharge cycle 101".

Figure 2:
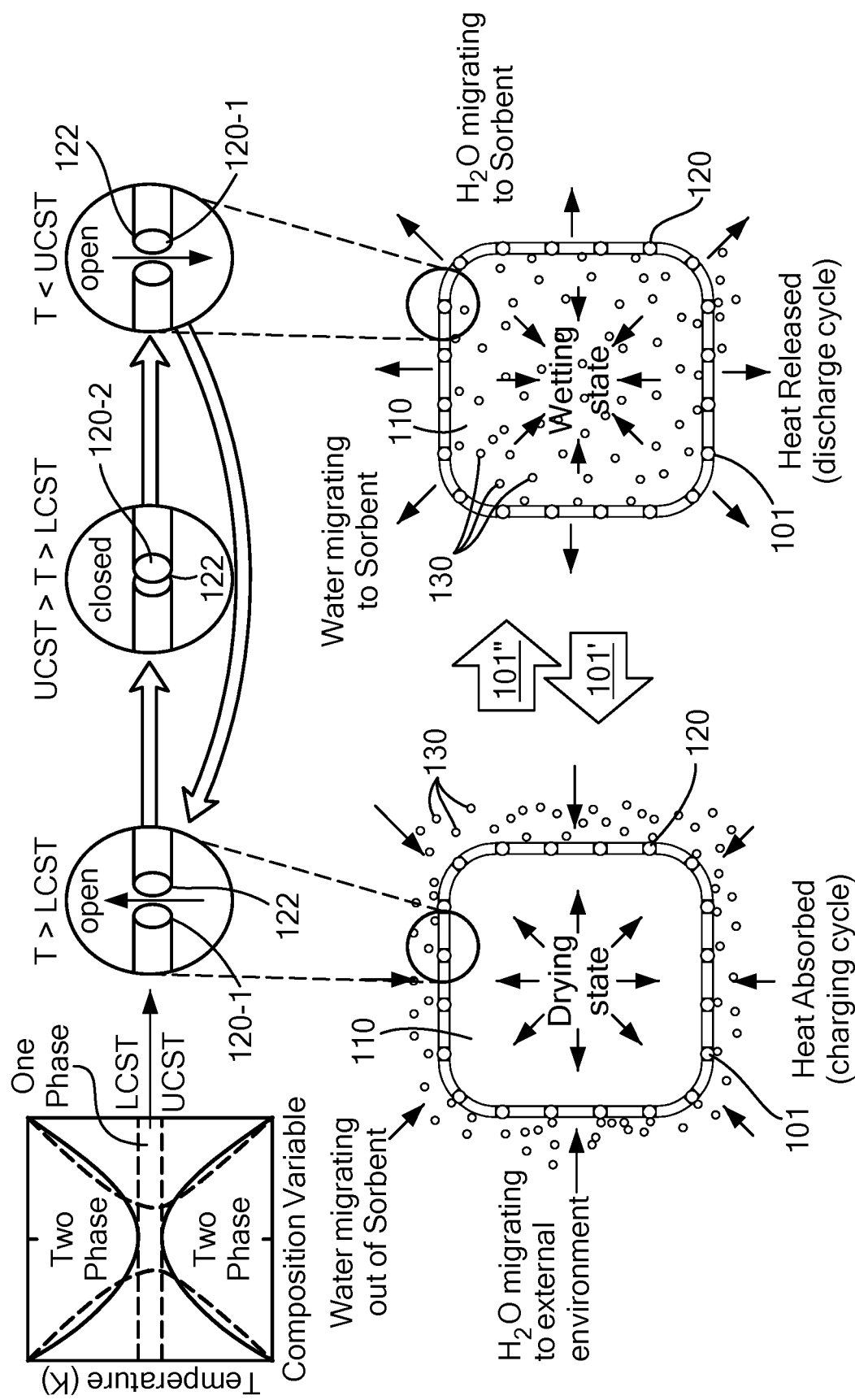
FIG. 2 shows an alternate gated thermo-responsive polymer and sorbent in a thermal charge and release cycle as disclosed herein.

FIG. 2 shows an alternate gated thermo-responsive polymer and sorbent in a thermal charge and release cycle as disclosed herein. Referring to FIGS. 1, 1A and 2, FIG. 2 shows a configuration of the sorbent polymer interaction whereby the polymer with UCST serves as a temperature dependent gating mechanism to regulate the desorption of sorbate, such as water, from the sorbent 110. Rather than selectively absorbing and retaining the sorbate, the polymer is adapted as a gating mechanism defined by the UCST for sorbate transport through the polymer 120 based on the temperature of the polymer. In the configurations herein, the polymer has thermally responsive fluidic capabilities based on the UCST or LCST for absorption, adsorption or gated passage. The selective fluidic response allows the sorbate to pass into or from the sorbent at or around the regeneration temperature of the sorbent for effecting heat storage. In the approach of FIG. 2, the sorbate 110 is pressured through the UCST polymer gate 122 when the sorbent temperature rises above the sorbent recharge temperature. When temperature remains above the polymer UCST, the gate 122 attains a closed state 120-2, the polymer retains the sorbate and is in a swollen state. The swollen polymer blocks the passage of sorbate and prevents the re-entry of external sorbate (such as water in the atmosphere) into the sorbent, thus acting as both a water reservoir and gating mechanism. When temperatures fall below the polymer UCST the polymer 120 becomes hydrophobic and expels its water which causes a volume change and subsequent polymer shrinkage and opening of the gate 120-1. Water 130 from the external environment is subsequently allowed to enter the sorbent 110 resulting in a release of its stored thermal energy Polymers that respond to variations in environmental conditions are an attractive class of materials for advanced applications including switchable hydrophilic-hydrophobic surfaces, temperature-triggered drug release, and thermally switchable optical devices. Thermo-responsive polymers with switchable hydrophobicity undergo a phase transition in response to temperature variation, changing from a homogeneous liquid solution into a collapsed polymer coil. Such thermo-responsive polymers are generally categorized as exhibiting lower or upper critical solution temperature behavior (LCST or UCST, respectively). Polymers with LCST behavior are soluble at low temperatures and partially soluble or insoluble upon increasing their temperature, while polymers with UCST behavior show the opposite solubility trends. Example UCST polymers are poly(methyl methacrylate) (PMMA) and poly(2-oxazoline)s in alcohol-water mixtures, with UCST ranging from 0 to 100° C. Thermo-responsive polymers with UCST behavior in water are less reported and include poly(betaine)s, which are zwitterionic polymers that have both positive and negative charges in their repeat unit. Two common poly(betaine)s with UCST behavior are poly(2-dimethyl(methacryloxyethyl) ammonium propane sulfonate) (PDMAPS-MA) and poly(3-(N-(3-methacrylamidopropyl)-N,N-dimethyl) ammonium propane sulfonate (PDMAPS-MAM). It should be noted that, while the sorbent is expected to exhibit an adsorbent reception of the fluid, an absorption reaction may also occur, as it is the fluidic exchange with the sorbent, and not the manner of sorbent retention, that provides the thermal exchange.

Figures 3A, 3B:
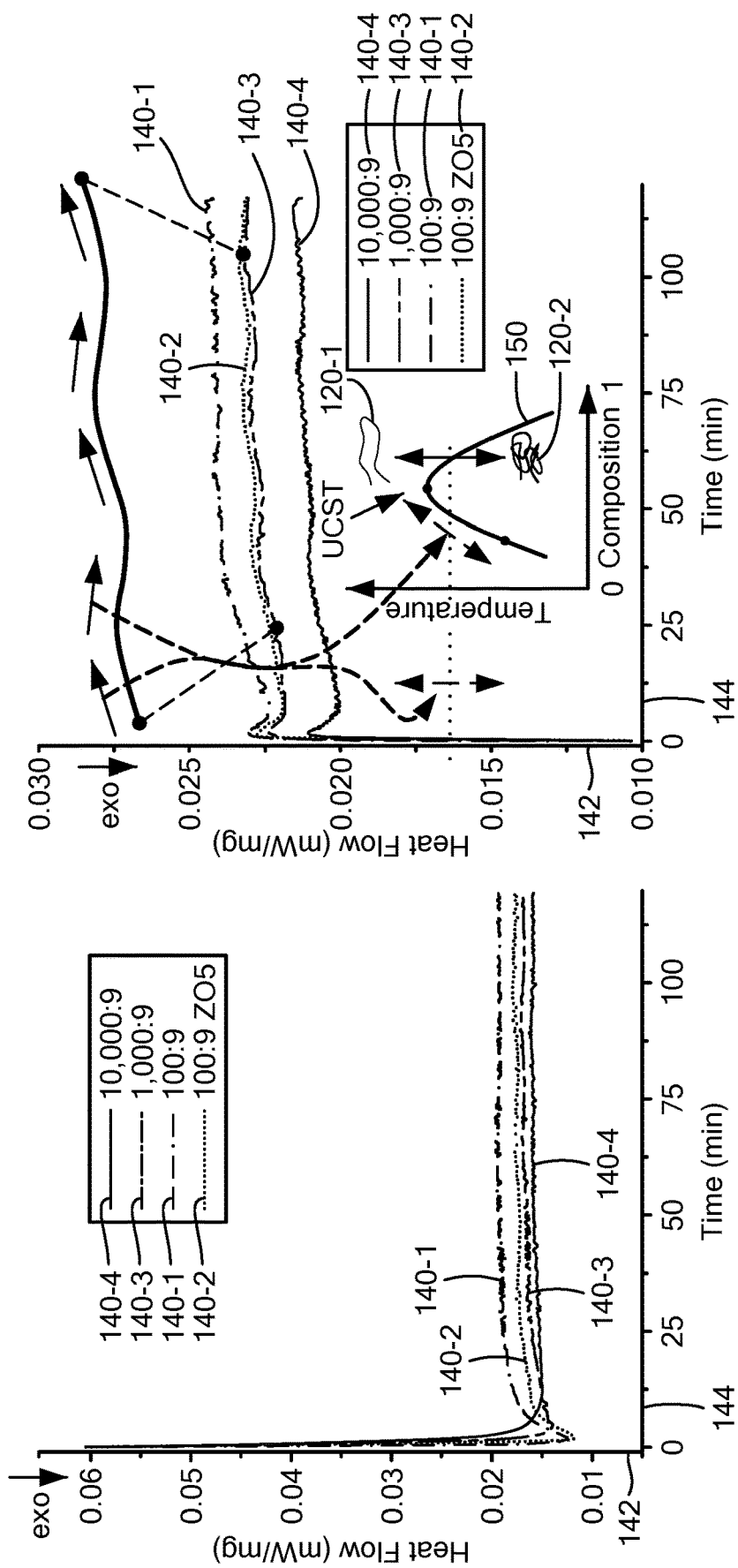
FIG. 3A shows thermal charging of the polymer-sorbent system of FIG. 1.
FIG. 3B shows thermal discharge of the polymer-sorbent system of FIG. 1.

FIG. 3A shows thermal charging of the polymer-sorbent system of FIG. 1, and FIG. 3B shows thermal discharge of the polymer-sorbent system of FIG. 1 in a comparison of discharging behavior of different polymer-zeolite composite formulations. Zeolites are microporous, aluminosilicate minerals commonly used as adsorbents, and perform well in various forms included in the sorbent 110. In general, assuming no mass transfer limitations, a 100:9 by weight ratio of polymer:sorbent may allow for maximum uptake of water into the sorbent 110 and sufficient polymer 120 to absorb the water during charging.

In an example configuration, the polymer 120 is a thermo-responsive polymer adapted for absorbing water 130 at a temperature above the UCST. The sorbent 110 then releases water 130 to the polymer 120 at a temperature greater than the UCST. It is therefore beneficial if the sorbent 110 has a regeneration temperature based on the UCST for releasing the water 130 to the polymer 120 at a temperature greater than the UCST.

In FIG. 3A, 70° C. charging for different composite formulations 140-1 . . . 140-4 are shown, graphing heat released 142 over time 144. FIG. 3B shows 10° C. discharging for the different composite formulations 140-1 . . . 140-4. Ratios are by mass of polymer:sorbent. The selected sorbent 110 and synthesized polymers 120 are combined in proportions that facilitate water exchange between the two system components. In the inset of FIG. 3B, as the composition of the water-polymer phase becomes more polymer rich, the transition temperature between one and two phases shifts along the curve 150, which will change the interactions between polymer and water and its transport rate from the polymer 120 to sorbent 110.

Figure 4:
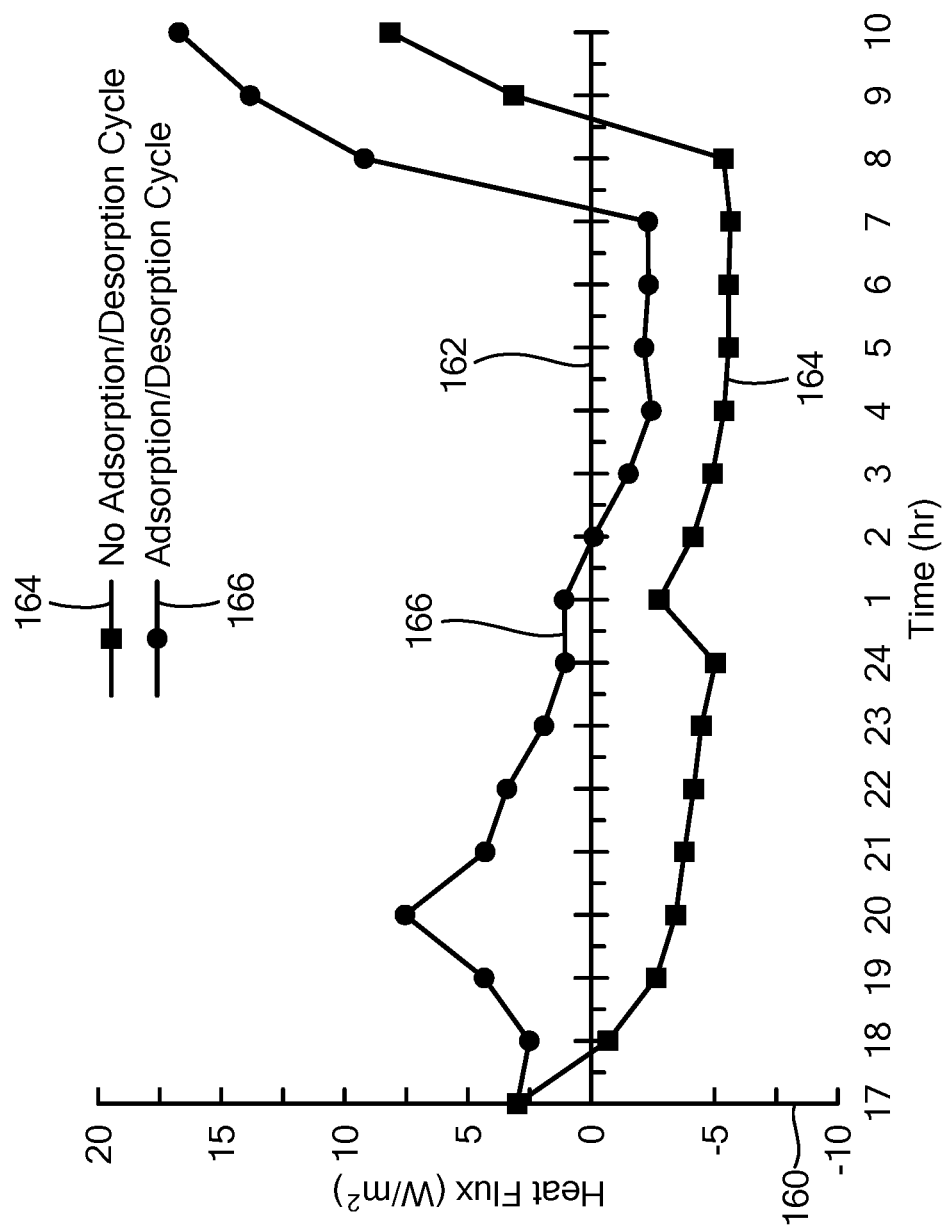
FIG. 4 shows thermal performance in an example building envelope application of the polymer-sorbent system of FIG. 1.

FIG. 4 shows thermal performance in an example building envelope application of the polymer-sorbent system of FIG. 1. In FIG. 4, in a practical implementation such as building insulation, the sorbent 110 is responsive to a phase transition for thermal release from adsorption of the fluidic medium, such as water 130, from the polymer 120. FIG. 4 depicts the heat flux 160 for an hourly building heating cycle 162, comparing the thermal response of the sorbent adsorption 166 to a conventional building envelope 164 without an adsorption cycle as disclosed herein. Conditioned spaces such as buildings typically operate around a thermostatically set temperature. FIG. 4 depicts selection of the charging temperature of the sorbent and the UCST of the polymer based on the target temperature derived from the thermostat. Concomitantly, the sorbent 110 absorbs the water 130 and releases the stored heat in a temperature-triggered manner. In this innovative system, the thermo-responsive polymer's UCST is used as a material-enabled thermostat to control the discharge of heat stored within the sorbent 110.

Figure 5:
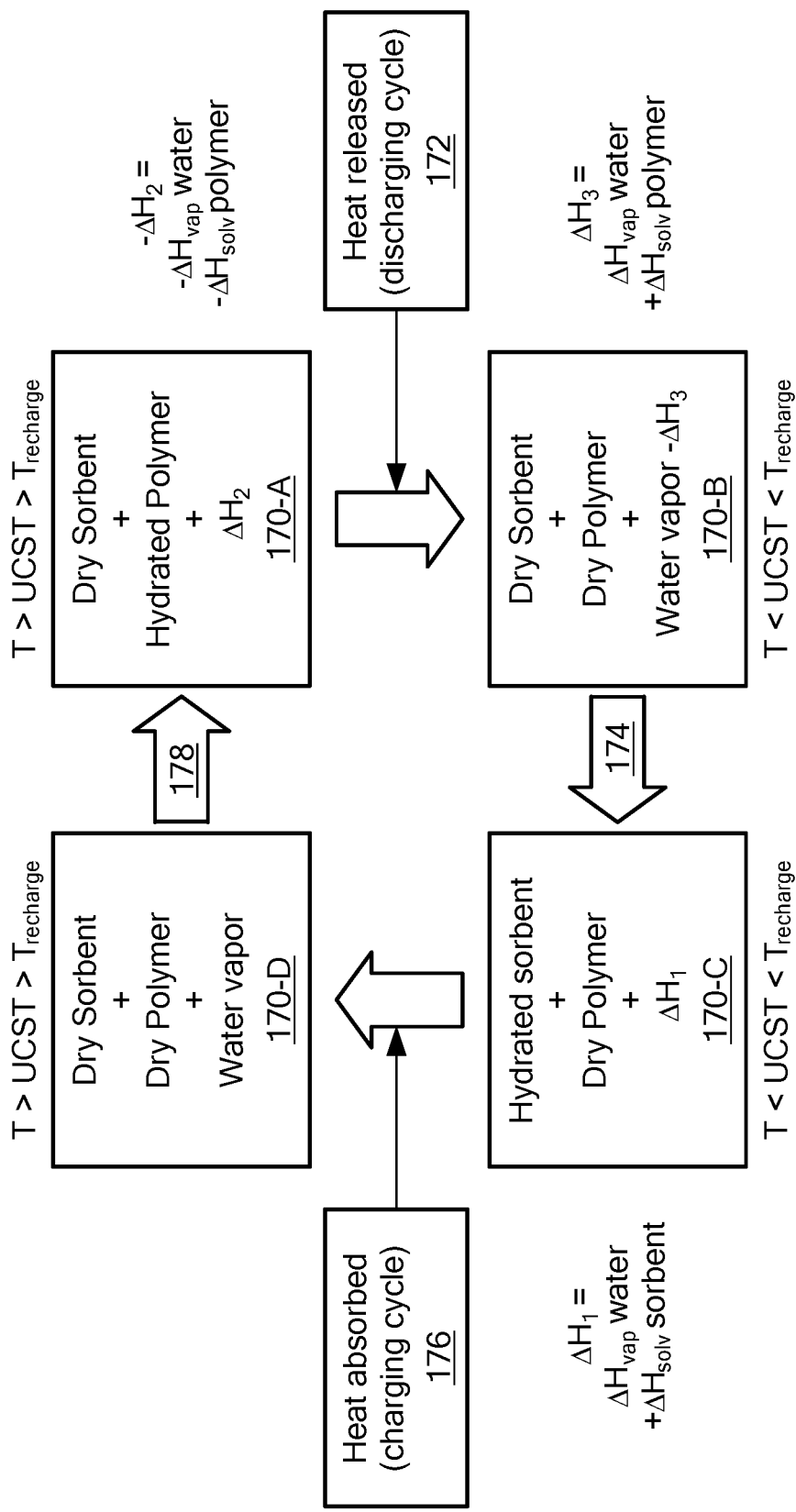
FIG. 5 shows a block diagram of the thermal cycle of FIGS. 3A and 3B.

FIG. 5 shows a block diagram of the thermal cycle of FIGS. 3A and 3B. The thermal cycle defines a system for thermal energy storage including the thermo-responsive polymer 120 in fluidic communication with the sorbent 110 adapted to retain water, in which the polymer 120 has a predetermined UCST for combining with water. In this system, the thermo-responsive polymer defines a temperature-dependent hydration reservoir for supplying water to the sorbent, such that the thermo responsive polymer is adapted to change hydrophobicity when an ambient temperature falls below the UCST. Based on the UCST, and a polymer 120 synthesized based on it, thermal storage occurs as increased ambient temperatures above the UCST cause water released from the sorbent to be absorbed by the polymer. Conversely, thermal release occurs as decreased ambient temperature below the UCST causes water release from the hydrophilic polymer 120 to migrate to the sorbent 110.

At step 170-A, a dry sorbent 110 and hydrated polymer 120-1 occur when the temperature is above the UCST and the system is releasing heat, shown at step 172. After heat is released, the polymer 120 has released water and begins a recharge, depicted at step 174. At 170-C, the dry polymer 120-2 is hydrophobic and resistant to water, now adsorbed/absorbed by the sorbent, until the temperature begins to rise above the UCST, as heat is absorbed (step 176) and the system transitions to 170-D. Heat continues to be absorbed as the sorbent sheds water, and the now hydrophilic polymer absorbs the water at step 178 and the system transitions to 170-A, fully recharged with thermal energy.

Figure 6:
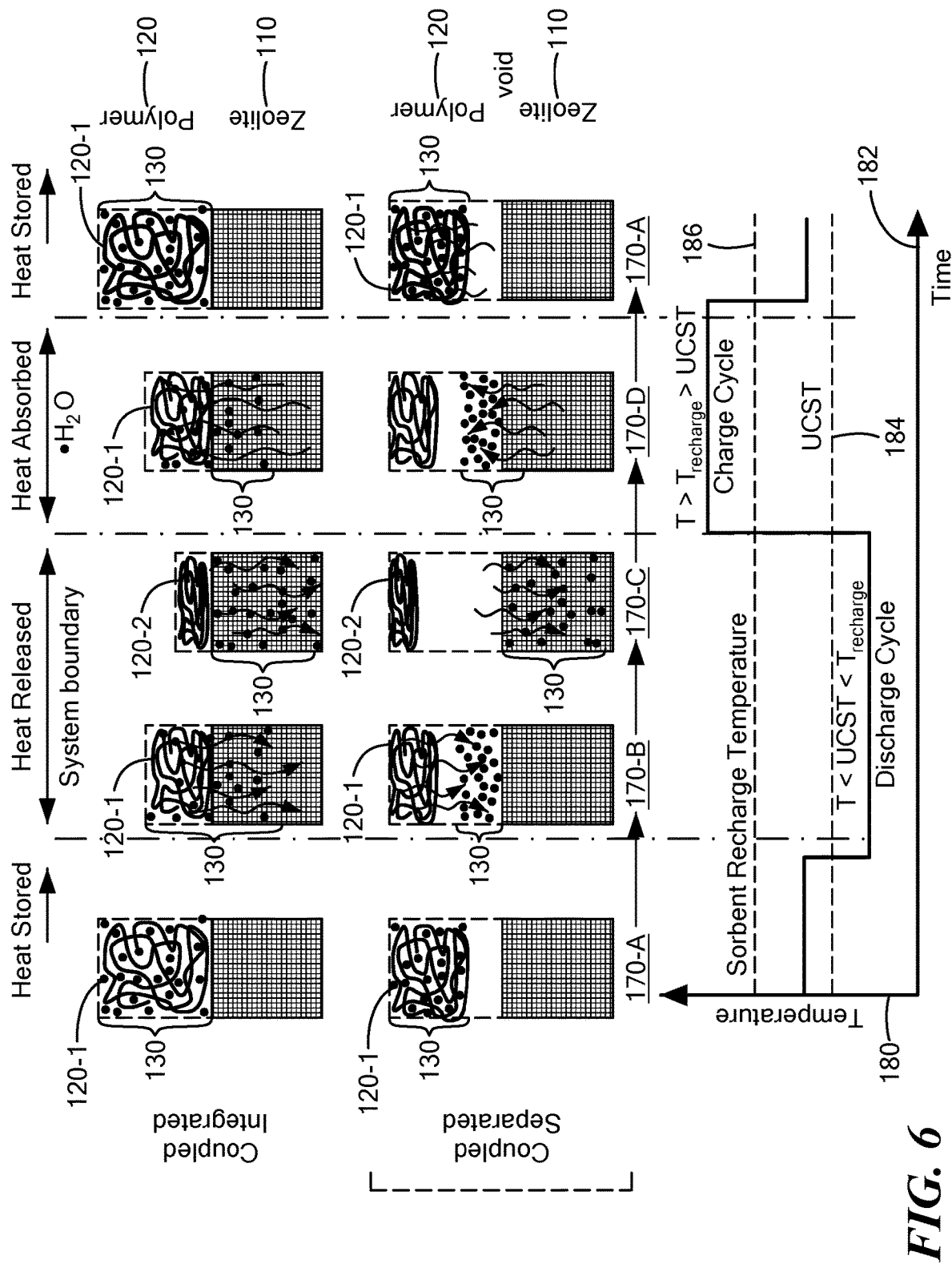
FIG. 6 shows a schematic of the thermal cycle depicted in FIG. 5.

FIG. 6 shows a schematic of the thermal cycle depicted in FIG. 5. FIG. 6 depicts schematics of coupled-separated and coupled-integrated systems and their associated temperature-dependent vapor transport (shown as dots of water molecules labeled with brackets 130) and heat-release/absorption, of which FIG. 5 represents a heat flow diagram for the charge/discharge cycles for a coupled-separated system. In FIG. 6, the cycle of FIG. 5 is shown through the steps 170-A . . . 170-D with the polymer 120 cycling through hydrophilic 120-1 and hydrophobic 120-2 states. The corresponding temperature 180 is plotted over time 182 as the temperature falls below the UCST 184 and rises above the sorbent recharge temperature 186. In the particular example illustrated, the sorbent 110 is a zeolite material adapted to adsorb water for thermal release at temperatures below the UCST. A particular advantage is that the sorbent 110 retains the thermal energy indefinitely until thermal release resulting from the ambient temperature falls below the UCST, rather than undergoing gradual thermal discharge or loss as with conventional thermal storage mediums.

Figure 7:
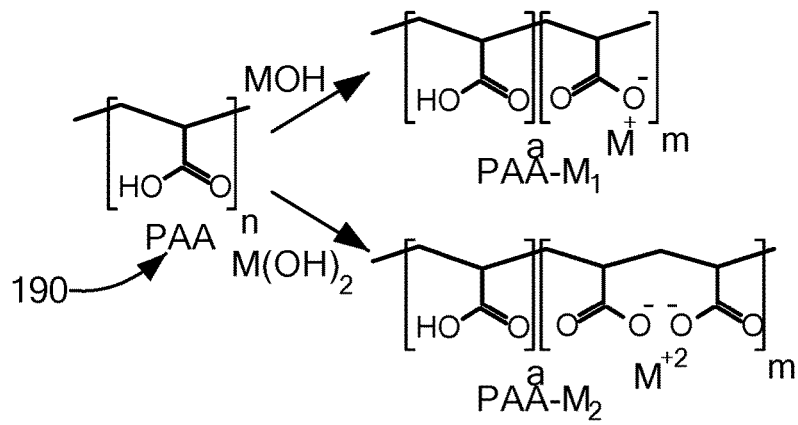
FIG. 7 shows a polymer with a tunable UCST.

FIG. 7 shows a polymer with a tunable UCST. As is apparent from the discussion above, synthesizing a polymer 120 to have a UCST according to a particular target temperature or thermostatic value permits complementary or synergistic operation between the polymer 120 and sorbent 110. In FIG. 7, a synthesized polymer is based on an UCST equal to the target temperature, where water is the fluidic medium, although alternate fluidic mediums may be devised.

Figure 8:
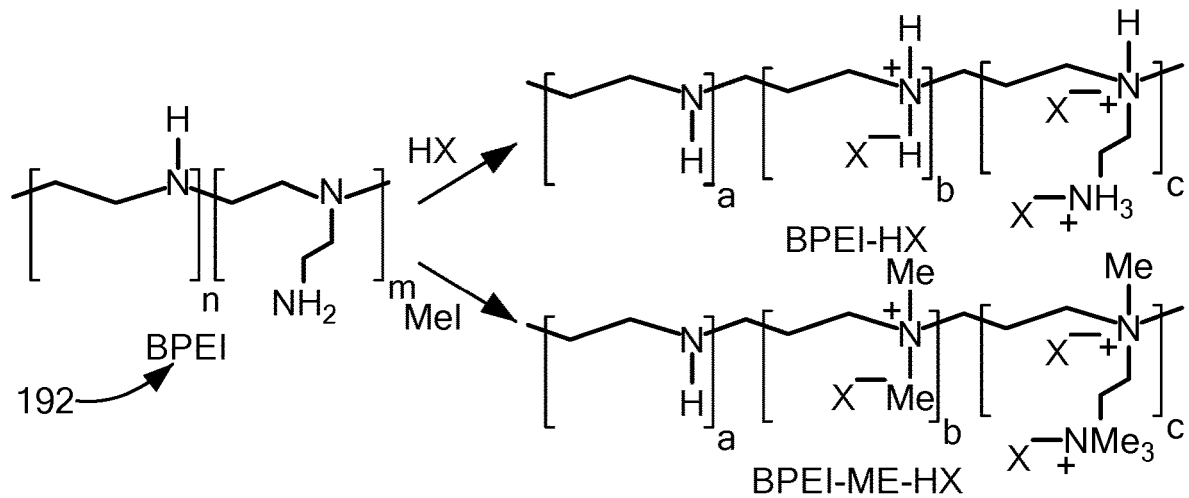
FIG. 8 shows an alternate polymer with a tunable UCST.

In particular configurations, the polymer 110 may be formed from poly-acrylic acid or polyethylene imine by introducing charged moieties into a polymer backbone to define a UCST in a range between 5°-40° C. Charged macromolecules with tunable UCSTs ranging from 5° C. to 40° C. will be produced by chemical modification of commercially available poly-acrylic acid, PAA 190, and polyethylene imine, PEI (FIG. 8). The hydrophilicity of these materials can be controlled by introducing charged moieties into the polymer backbone. The presence of these charged groups disrupts the strong intramolecular hydrogen-bonded networks within these compounds and facilitates water absorption.

Referring to FIG. 7, charged groups are introduced into polyacrylic acid by partial neutralization of the carboxylic acids using either monovalent (PAA-M1) or divalent hydroxides (PAA-M2). The UCST of these compounds can be tuned to be between 20° C. and 40° C. by varying the neutralization extent, the chemical identity of the base and the molecular weight of the starting polymer. The water adsorption and desorption rate can also be controlled by varying the molecular weight and degree of branching of these polymers FIG. 8 shows an alternate polymer with a tunable UCST. Non-charged polymers with a tailored UCST ranging from 5° C. to 60° C. may be synthesized by copolymerization of acrylonitrile and acrylamide. The introduction of the acrylonitrile motifs into the polymer backbone decreases the hydrophilicity of the resulting macromolecules and allows fine-tuning of the UCST. Continuing to refer to FIG. 8, charged motifs will be introduced into the backbone of PEI 192 by either partial neutralization of the amines with hydrogen halides (BPEI-HX) or by methylation of the nucleophilic nitrogen atoms present in the polymer (BPEI-ME-X). The UCST of these compounds can be tuned between 5° C. and 25° C. by changing the relative amount of nitrogen atoms within the macromolecule that bear a positive charge.

Figure 9:
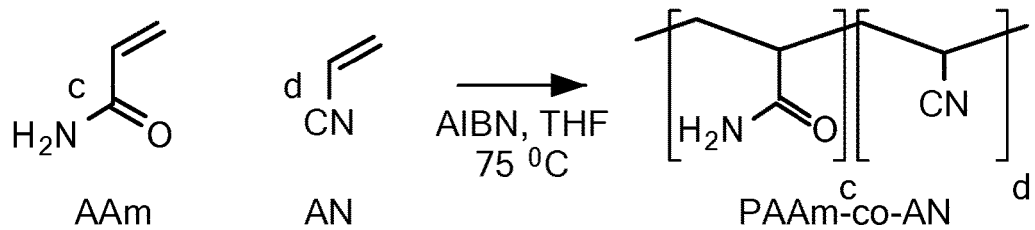
FIG. 9 shows a copolymer configuration of a tunable UCST.

FIG. 9 shows a copolymer configuration of a tunable UCST. Referring to FIG. 9, the polymer 120 may be formed from insertion of hydrophobic moieties into a hydrogen-bonding polyacrylamide backbone by random copolymerization of acrylonitrile and acrylamide to define a UCST in a range between 5° C.-60° C. Hydrophobic moieties will be inserted into the strongly hydrogen-bonding polyacrylamide backbone by random copolymerization of acrylonitrile and acrylamide.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A thermal storage composition, comprising:
    a polymer having thermally responsive fluidic capabilities based on an upper critical solution temperature (UCST) or lower critical solution temperature (LCST), the polymer formed from poly-acrylic acid or polyethylene imine by introducing charged moieties into a polymer backbone to define a UCST in a range between 5° C.-40° C.;
    a sorbent in fluidic communication with the polymer; and
    a fluid sorbate for conveying thermal energy between the polymer and the sorbent, wherein the polymer changes from hydrophobic to hydrophilic for absorbing water at a temperature above the UCST, the water defining a sorbate.

2. The composition of claim 1 wherein the polymer is a thermo-responsive polymer adapted for absorbing the sorbate at a temperature above the UCST or below the LCST.

3. The composition of claim 2 wherein the sorbent releases the sorbate to the polymer at a temperature greater than the UCST.

4. The composition of claim 1 wherein the sorbent has a regeneration temperature based on the UCST for releasing the sorbate to the polymer at a temperature greater than the UCST.

5. The composition of claim 4 wherein the sorbent is a zeolite material adapted to adsorb water as the sorbate for thermal release at temperatures below the UCST.

6. The composition of claim 1 wherein the polymer is adapted as a gating mechanism defined by the UCST or LCST for sorbate transport through the polymer based on the temperature of the polymer.

7. The composition of claim 1 wherein thermal storage occurs as increased ambient temperatures above the UCST causes water released from the sorbent to be absorbed by the polymer.

8. The composition of claim 1 wherein thermal release occurs as decreased ambient temperature below the UCST causes water release from the hydrophilic polymer to migrate to the sorbent.

9. The composition of claim 8 wherein the sorbent retains the thermal energy indefinitely until thermal release resulting from the ambient temperature falling below the UCST.

10. A thermal storage composition, comprising:
    a polymer having thermally responsive fluidic capabilities based on an upper critical solution temperature (UCST) or lower critical solution temperature (LCST), the polymer formed from insertion of hydrophobic moieties into a hydrogen-bonding polyacrylamide backbone by random copolymerization of acrylonitrile and acrylamide to define a UCST in a range between 5° C.-60° C.;
    a sorbent in fluidic communication with the polymer; and
    a fluid sorbate for conveying thermal energy between the polymer and the sorbent, wherein the polymer changes from hydrophobic to hydrophilic for absorbing water at a temperature above the UCST, the water defining a sorbate.

* * * * *